United States Patent
Han

(10) Patent No.: US 9,423,628 B2
(45) Date of Patent: Aug. 23, 2016

(54) VOICE COIL MOTOR

(71) Applicant: LG INNOTEK CO., LTD., Seoul (KR)

(72) Inventor: Jin Suk Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 628 days.

(21) Appl. No.: 13/717,210

(22) Filed: Dec. 17, 2012

(65) Prior Publication Data

US 2013/0222914 A1    Aug. 29, 2013

(30) Foreign Application Priority Data

Feb. 23, 2012 (KR) .................. 10-2012-0018302

(51) Int. Cl.
*G02B 27/64* (2006.01)
*G02B 7/08* (2006.01)
*H02K 41/035* (2006.01)

(52) U.S. Cl.
CPC ............. *G02B 27/64* (2013.01); *G02B 7/08* (2013.01); *G02B 27/646* (2013.01); *H02K 41/0356* (2013.01)

(58) Field of Classification Search
CPC ........ G02B 7/00; G02B 7/003; G02B 7/005; G02B 7/02; G02B 7/021; G02B 7/022; G02B 7/023; G02B 7/026; G02B 7/028; G02B 7/04; G02B 7/09; G02B 7/10
See application file for complete search history.

(56) References Cited

U.S. PATENT DOCUMENTS

| | | | |
|---|---|---|---|
| 2009/0252488 A1* | 10/2009 | Eromaki et al. | 396/529 |
| 2011/0169348 A1* | 7/2011 | Park | 310/15 |
| 2011/0176046 A1* | 7/2011 | Hu et al. | 348/335 |
| 2011/0217029 A1 | 9/2011 | Wu et al. | |
| 2012/0147258 A1* | 6/2012 | Park | 348/374 |
| 2012/0200176 A1* | 8/2012 | Park | 310/12.16 |

FOREIGN PATENT DOCUMENTS

| | | |
|---|---|---|
| CN | 101819314 A | 9/2010 |
| CN | 102016708 A | 4/2011 |
| CN | 102062926 A | 5/2011 |
| CN | 102073191 A | 5/2011 |
| CN | 102121505 A | 7/2011 |
| JP | H10207467 A | 8/1998 |
| WO | WO-2011155318 A1 | 12/2011 |

OTHER PUBLICATIONS

Office Action dated May 19, 2016 in Chinese Application No. 201210592928.4.

* cited by examiner

*Primary Examiner* — Scott J Sugarman
*Assistant Examiner* — Robert E Tallman
(74) *Attorney, Agent, or Firm* — Saliwanchik, Lloyd & Eisenschenk

(57) ABSTRACT

A VCM (Voice Coil Motor) is disclosed, the VCM including an auto focus module vertically moving a lens and having terminals exposed to an outer surface, a fixation member coupled to the outer surface of the auto focus module to expose the terminals, a handshake correction module including a first driving unit coupled to an outer surface of the fixation member and a second driving unit opposite to the first driving unit, a connection member connecting an upper end of the auto focus module to an upper end of the handshake correction module, and a flexible circuit board connected to the terminals and the second driving unit to apply a driving signal to the first and second driving units.

19 Claims, 5 Drawing Sheets

VOICE COIL MOTOR

CROSS-REFERENCE TO RELATED APPLICATION

This application claims the benefit under 35 U.S.C. §119 of Korean Patent Application No. 10-2012-0018302, filed Feb. 23, 2012, which is hereby incorporated by reference in its entirety.

BACKGROUND

1. Field of the Invention

The present disclosure relates to a VCM (Voice Coil Motor).

2. Description of Related Art

Recently, mobile communication devices and game devices are mounted with a super small digital camera module generating a digital image or a digital video. The conventional super small digital camera module includes a lens focusing an outside light, and an image sensor storing the light having passed the lens as a digital image or a digital video.

The conventional super small digital camera module, being so small, suffers from a disadvantage of disablement to install a structure for adjustment of a gap between a lens and an image sensor changing an outside light to a digital image or a digital video (moving image), making it difficult to perform a close-up (or macro) photographing or to generate a vivid digital image.

Recently, development of a VCM (Voice Coil Motor) enables a super small camera module to adjust a gap between a lens and an image sensor, whereby a close-up (or macro) photographing can be performed and a vivid digital image can generated as well.

Meanwhile, the mobile communication devices mounted with a super small digital camera module suffer from disadvantages of a severe handshake to greatly reduce the quality of a digital image, and as a countermeasure to cope with the disadvantages, a handshake correction function capable of generating a vivid digital image despite the handshake is greatly required.

BRIEF SUMMARY

The present invention is directed to provide a VCM adequate to photograph a vivid and clear digital image or video by performing adjustment of a gap between a lens and an image sensor and by realizing a handshake correction function as well.

Technical problems to be solved by the present disclosure are not restricted to the above-mentioned descriptions, and any other technical problems not mentioned so far will be clearly appreciated from the following description by skilled in the art.

In one general aspect of the present invention, there is provided a VCM (Voice Coil Motor), the VCM comprising: an auto focus module vertically moving a lens and having terminals exposed to an outer surface; a fixation member coupled to the outer surface of the auto focus module to expose the terminals; a handshake correction module including a first driving unit coupled to an outer surface of the fixation member and a second driving unit opposite to the first driving unit; a connection member connecting an upper end of the auto focus module to an upper end of the handshake correction module; a flexible circuit board connected to the terminals and the second driving unit to apply a driving signal to the first and second driving units.

The VCM according to the present disclosure has an advantageous effect in that a digital image quality is further improved by freely adjusting a gap between a lens and an image sensor using an auto focus module, and handshake correction is also performed by tilting the auto focus module while an upper end of the auto focus module is elastically fixed.

BRIEF DESCRIPTION OF THE DRAWINGS

In the drawings, the width, length, thickness, etc. of components may be exaggerated or reduced for the sake of convenience and clarity. Furthermore, throughout the descriptions, the same reference numerals will be assigned to the same elements in the explanations of the figures, and explanations that duplicate one another will be omitted. Now, a voice coil motor according to the present disclosure will be described in detail with reference to the accompanying drawings.

The teachings of the present disclosure can be readily understood by considering the following detailed description in conjunction with the accompanying drawings, in which.

DETAILED DESCRIPTION

Advantages and features of the present disclosure may be understood more readily by reference to the following detailed description of exemplary embodiments and the accompanying drawings.

Detailed descriptions of well-known functions, configurations or constructions are omitted for brevity and clarity so as not to obscure the description of the present disclosure with unnecessary detail. Thus, the present disclosure is not limited to the exemplary embodiments which will be described below, but may be implemented in other forms.

The meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Now, exemplary embodiments of a VCM (Voice Coil Motor) according to the present disclosure will be explained in detail together with the figures.

Figure 1:
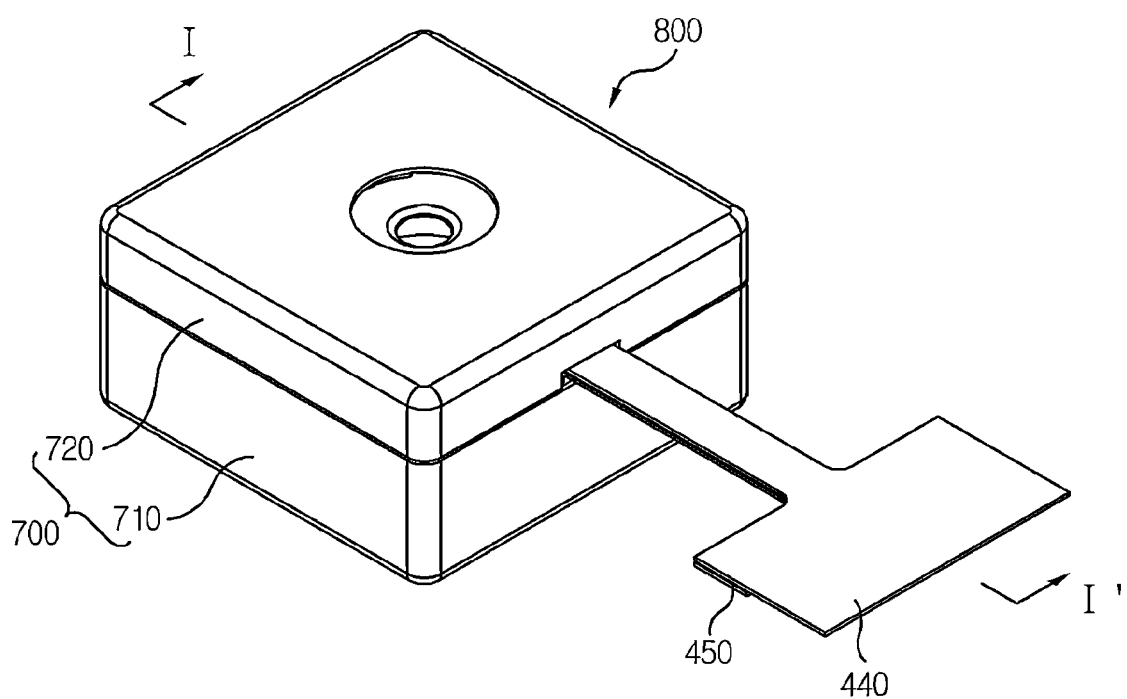
FIG. 1 is a schematic perspective view illustrating a VCM according to an exemplary embodiment of the present disclosure.
Figure 2:
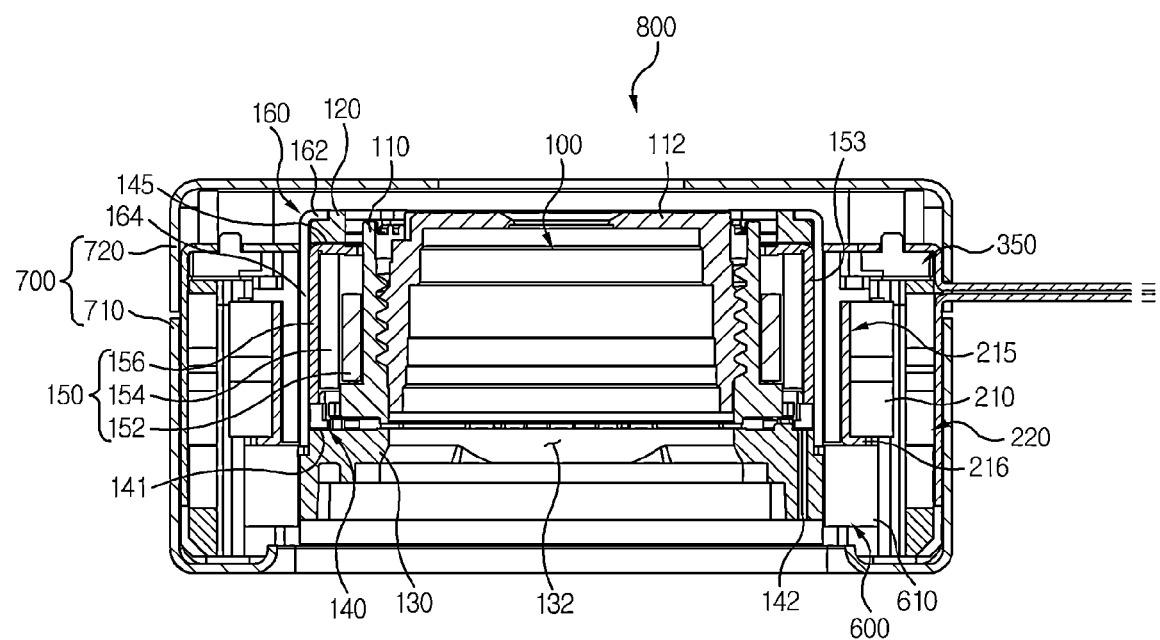
FIG. 2 is a cross-sectional view taken along line I-I' of FIG. 1.
Figure 3:
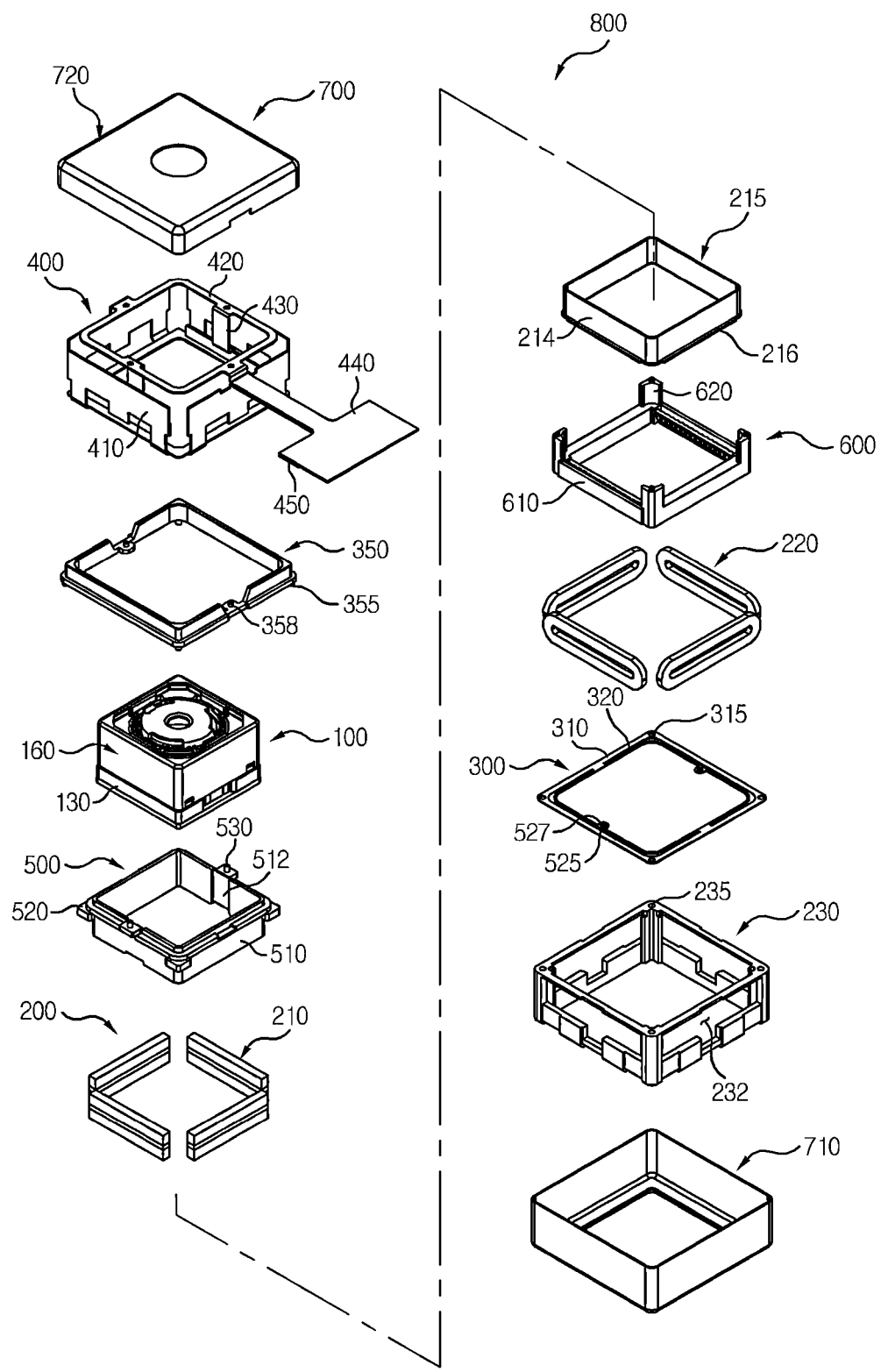
FIG. 3 is an exploded perspective view of a VCM in FIG. 1.

FIG. 1 is a schematic perspective view illustrating a VCM according to an exemplary embodiment of the present disclosure, FIG. 2 is a cross-sectional view taken along line I-I' of FIG. 1, and FIG. 3 is an exploded perspective view of a VCM in FIG. 1.

Referring to FIGS. 1, 2 and 3, a voice coil motor (hereinafter referred to as VCM, 800) includes an auto focus module (100), a handshake correction module (200), a connection member (300), a fixation member (500) and a flexible circuit board (400).

The auto focus module (100) serves to adjust a gap between an image sensor (not shown) and a lens. The auto focus module (100) includes a bobbin (110), a stator (120), a base (130), an elastic member (140), a driving unit (150) and an auto focus module cover (160).

The bobbin (110) takes a shape of a barrel embedded therein with lenses (not shown) combined with convex and concave lenses. In an exemplary embodiment of the present disclosure, the bobbin (110) takes a shape of a cylinder. The bobbin (110) is formed at an inner surface with a screw thread coupled to a lens barrel (112) for mounting the lenses. The bobbin (110) is formed at a bottom end of an outer surface with a staircase sill for supporting a portion of the driving unit (150, described later).

The base (130) serves to support the stator (120, described later). The base (130) takes a shape of a square plate, for example, and is centrally formed with an opening (132) penetrating the base (130) and allowing light having passed the lens to pass. The base (130) is arranged at an upper surface with the bobbin (110). A bottom surface of the bobbin (110) may be brought into contact with an upper surface of the base (130) in a case no driving signal is applied to the driving unit (150, described later). The bobbin (110) is driven to one direction to perform an auto focus operation in a case the upper surface of the base (130) is brought into contact with the bottom surface of the bobbin (110).

Meanwhile, the bottom surface of the bobbin (110) may be distanced from the upper surface of the base (130) in a case no driving signal is applied to the driving unit (150, described later). In a case the bottom surface of the bobbin (110) is distanced from the upper surface of the base (130), the bobbin (110) is driven to one direction to perform the auto focus operation.

The stator (120) is arranged at the upper surface of the base (130). The stator (120) takes a shape of a square frame that is opened at an upper surface and a bottom surface. Each lateral surface of the stator (120) is opened to fix the driving unit (150). The elastic member (140) includes a bottom elastic member (141) and an upper elastic member (145). The bottom elastic member (141) is formed in a pair, each insulated from the other.

Each bottom elastic member (141) includes an inner elastic unit, an outer elastic unit and a connection elastic unit. The inner elastic unit is coupled to the bottom surface of the bobbin (110). The outer elastic unit is arranged at the upper surface of the base (130), and formed with terminals (142). The connection elastic unit connects the inner and outer elastic units. The terminals (142) formed at the outer elastic unit is electrically connected to the driving unit (150, describe later).

Meanwhile, the terminals (142) are exposed from an outer surface of the base (130), and electrically connected to the flexible circuit board (400, described later).

The upper elastic member (145) is formed in one unit, and includes an inner elastic unit, an outer elastic unit and a connection unit. The inner elastic unit of the upper elastic member (145) is coupled to the upper surface of the bobbin (110) facing the bottom surface, the outer elastic unit of the upper elastic member (145) is coupled to the stator (120), and the connection unit of the upper elastic member (145) connects the inner and outer elastic units.

The driving unit (150) includes a first auto focus driving unit (152) and a second auto focus driving unit (154). The first auto focus driving unit (152) is coupled to an outer surface of the bobbin (110), and is supported by a staircase sill formed at a bottom end of the outer surface of the bobbin (110).

In an exemplary embodiment of the present disclosure, the first auto focus driving unit (152) may include a coil block wound on the outer surface of the bobbin (110), for example. Alternatively, the first auto focus driving unit (152) may include a magnet arranged at the outer surface of the bobbin (110).

The second auto focus driving unit (154) is arranged at an outer surface of the first auto focus driving unit (152) and is fixed to an opening formed at a lateral surface of the stator (120).

In an exemplary embodiment of the present disclosure, in a case the first auto focus driving unit (152) includes a coil block, the second auto focus driving unit (154) includes a magnet. Alternatively, in a case the first auto focus driving unit (152) includes a magnet, the second auto focus driving unit (154) includes a coil block. In an exemplary embodiment of the present disclosure, the first auto focus driving unit (152) includes a coil block, and the second auto focus driving unit (154) includes a magnet.

In a case the second auto focus driving unit (154) includes a magnet, the outer elastic unit of the upper elastic member (145) at the elastic member (140) is interposed and fixed between the stator (120) and a yoke (153).

The auto focus module cover (160) is comprised of an upper surface (162) and a lateral surface (164), where a bottom surface of the auto focus module cover (160) takes a shape of a completely opened cylinder. The auto focus module cover (160) may include a metal plate, for example.

A center portion of the upper surface (162) of the auto focus module cover (160) is formed with an opening, and the upper surface (162) depresses and fixes the upper surface of the stator (120). The lateral surface of auto focus module cover (160) is fixed to a lateral surface of the base (120) using a hook or the like. The base (130) and the stator (120) are coupled by the auto focus module cover (160), and the bobbin (110) is coupled to the base (130) and the stator (120) using the elastic member (140).

Figure 4:
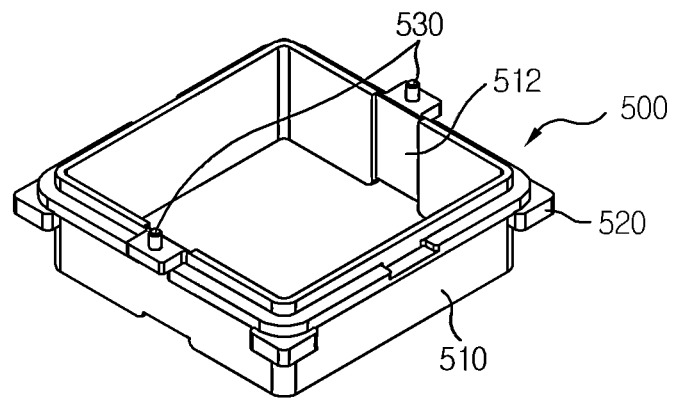
FIG. 4 is a perspective view illustrating a fixation member of FIG. 1.

FIG. 4 is a perspective view illustrating a fixation member of FIG. 1.

Referring to FIGS. 3 and 4, the fixation member (500) serves to fix a portion of the handshake correction module (200) to the auto focus module (100).

The fixation member (500) is opened at upper and bottom surfaces, and includes four (4) lateral surfaces (510), each being perpendicularly formed. A portion of the lateral surfaces (510) corresponding to each terminal (152) of the pair of bottom elastic members (141) is formed with accommodation grooves (512) connecting an upper end and a bottom end of the lateral surface (510). The accommodation groove (512) is accommodated by a third board unit of the flexible circuit board (400, described later).

An upper corner of each lateral surface (510) of the fixation member (500) is formed with a gap reduction unit (520) reducing a gap between the fixation member (500) and a housing (described later). The gap reduction unit (520) reduces a gap formed between a housing (300) of the handshake correction module (200, described later) and the fixation member (500) coupled to the auto focus module (100) to inhibit an unnecessary shaking or trembling at an upper end of the auto focus module (100), whereby a digital image quality can be further improved.

Meanwhile, an upper end of the lateral surface (510) of the fixation member (500) corresponding to the accommodation groove (512) formed at the fixation member (500) is protrusively formed with bosses (530), and the bosses (530) are coupled to a second board unit of the flexible circuit board (400, described later).

An inner surface of the lateral surface (510) of the fixation member (500) is press-fitted into an outer surface of the auto focus module (100), where the fixation member (500) exposes terminals (142) of the bottom elastic member (141) of the auto focus module (100).

The handshake correction module (200) includes first driving units (210) coupled to an outer surface of the fixation member (500) coupled to an outer surface of the auto focus module (100), and second driving units (220), each being opposite to each of the first driving units (210). The first driving unit (210) may include flat magnets arranged on each of the lateral surfaces (510) of the fixation member (500), for example. Alternatively, each of the first driving units (210) may include a coil block wound on the lateral surface (510) of the fixation member (500).

In an exemplary embodiment of the present disclosure, the first driving unit (210) includes flat magnets, and in order to inhibit a magnetic flux generated from the flat magnets from being provided to the auto focus module (100), a handshake correction module yoke (215) having upper/bottom surfaces-opened metal lateral plate (214) is interposed between each lateral surface (510) of the fixation member (500) and the first driving unit (210).

The handshake correction module yoke (215) is formed at a bottom surface with a support unit (216) bent outward from the handshake correction module yoke (215) in order to support the first driving unit (210).

Four (4) second driving units (220) are formed to face each of the four (4) first driving unit, and the second driving unit (220) may include a rectangular coil block opposite to each of the first driving units. The auto focus module (100) is tilted inside the handshake correction module yoke (215) to correct the handshake as a driving signal is individually applied to the second driving unit (220) including the coil block.

Meanwhile, the handshake correction module (200) further include a housing (230) for fixing the second driving unit (220). The housing (220) is formed only with upper/bottom surfaces-opened lateral surfaces, and each lateral surface is formed with an opening (232), and each opening (232) is fixed by each of the second driving units (220) including the coil block. The each of the second driving units (220) including the coil block is arranged opposite to the first driving unit (210) fixed to the auto focus module (100).

Each upper corner of the housing (230) is formed with a coupling groove (230).

Meanwhile, the VCM (800) according to an exemplary embodiment of the present disclosure further includes a support member (600). The support member (600) includes pedestal units (610) each formed in a shape of a square frame, and coupling pillars each protruded from an upper corner of the pedestal unit (610). An upper surface of the pedestal unit (610) is arranged with a bottom surface of the first driving unit (210) of the handshake correction module (200) coupled to the fixation member (500) coupled to an outer surface of the auto focus module (100). The coupling pillar is coupled to the gap reduction unit (520) of the fixation member (500).

The first driving unit (210) of the handshake correction module (200) and the handshake correction module yoke (215) are securely coupled to the auto focus module (100) by the support member (600), where the first driving unit (210) of the handshake correction module (200) is inhibited by the support member (600) from being disengaged from the auto focus module.

Meanwhile, the pedestal unit (610) of the support member (600) not only serves to support the first driving unit (210), but also to fix a third board unit of the flexible circuit board (400, described later) arranged opposite to the terminals (142)-exposed outer surface in the base (130) to the terminals (142).

Referring to FIG. 1 again, the connection member (300) is arranged at an upper surface of the housing (230) fixing the second driving unit (220) of the handshake correction module (200) to elastically connect the auto focus module (100) and the housing (230) of the handshake correction module (200). That is, the connection member (300) is fixed to an upper end of the auto focus module (100), and the auto focus module (100) is tilted at a bottom end thereof about the upper end by elastic fixation of the connection member (300) to the upper end of the auto focus module (100).

The coupling of the connection member (300) to the upper end of the auto focus module (100) inhibits the upper end of the auto focus module (100) from being unnecessarily vibrated or shaken in comparison with the coupling of the connection member (300) to a bottom end of the auto focus module (100), whereby a digital image quality generated from the image sensor module can be further enhanced.

The connection member (300) includes an outer connection unit (310) and an inner connection unit (320), and a slip-type space is formed between the outer connection unit (310) and the inner connection unit (320). The outer connection unit (310) is arranged at an upper end of the housing (230) of the handshake correction module (200), and is formed with a through hole (315) at a position corresponding to the coupling groove (35) formed at the upper end of the housing (230).

The inner connection unit (320) is formed with a coupling unit (527) formed with a coupling hole (525) coupled to the boss (530) of the fixation member (500) coupled to an outer surface of the auto focus module (100). That is, the inner connection unit (320) is elastically coupled to the fixation member (500). The connection member (300) is arranged at an upper surface with a cover (350).

The cover (350) takes a shape of a square frame. The cover (350) is formed at a bottom surface with a coupling lug (355) coupled to the coupling groove (235) formed at an upper end of the housing (230) of the handshake correction module (200) by penetrating the through hole (315) formed at the outer connection unit (310) of the connection member (300). The cover (350) is formed at an upper surface with bosses (358) coupled to the flexible circuit board (400, described later).

Figure 5:
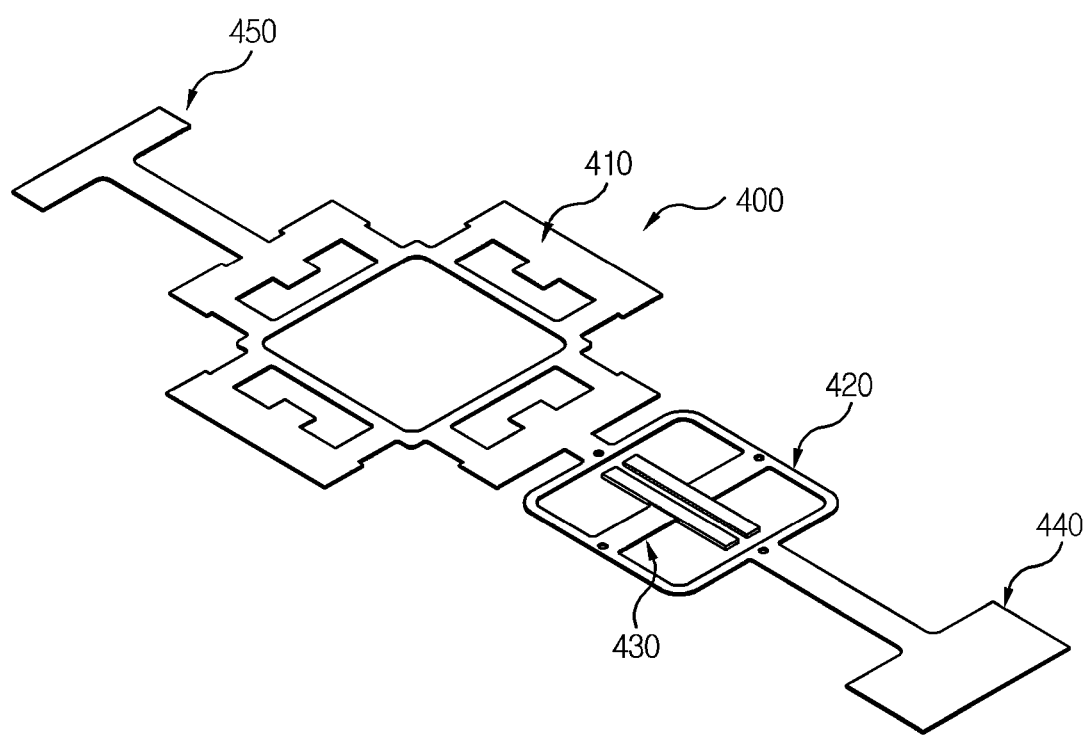
FIG. 5 is a planar figure of a flexible circuit board of FIG. 1.
Figure 6:
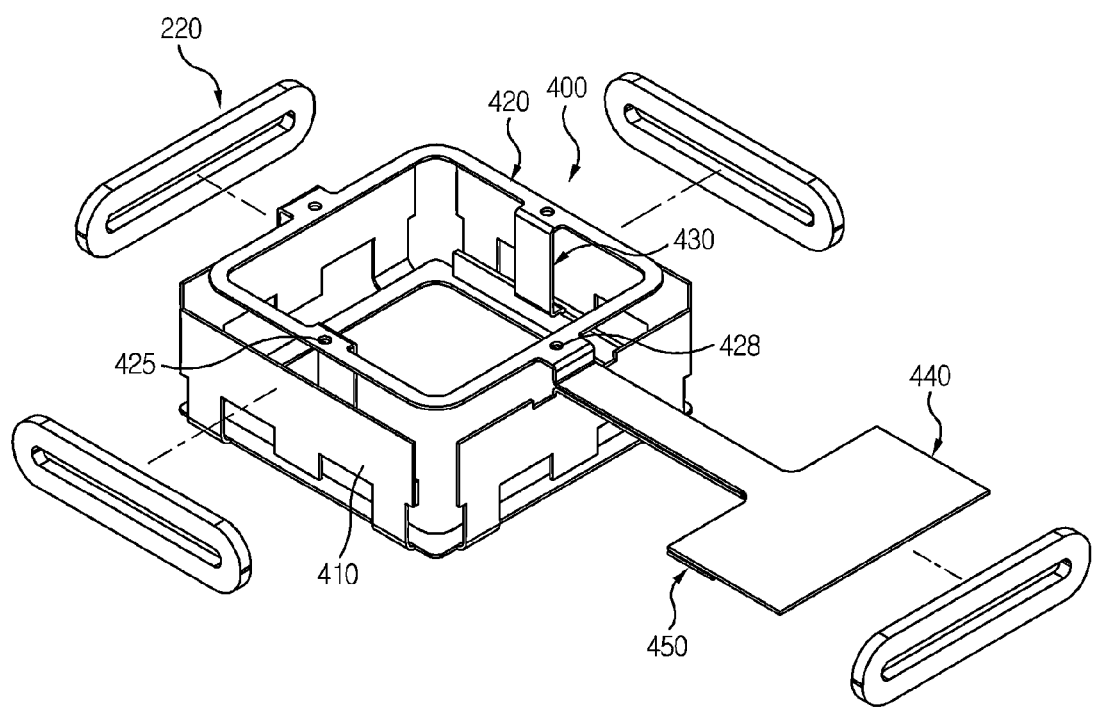
FIG. 6 is an extracted and enlarged perspective view illustrating a flexible circuit board of FIG. 1.

FIG. 5 is a planar figure of a flexible circuit board of FIG. 1, and FIG. 6 is an extracted and enlarged perspective view illustrating a flexible circuit board of FIG. 1.

Referring to FIGS. 1, 5 and 6, the flexible circuit board (400) allows the auto focus module (100) to perform the auto focus operation, and allows the handshake correction module (200) to perform the handshake correction operation by transmitting a driving signal transmitted from an outside, to the second driving unit (220) including the coil block of the handshake correction module (200), and to the terminals (142) exposed from the auto focus module (100).

The flexible circuit board (400) includes a first board unit (410), a second board unit (420) and a third board unit (430).

In addition, the flexible circuit board (400) may further include a connection board (440) and an additional connection board (450).

Each of the first board units (410) is formed at each lateral surface of a frame board (415) formed in the shape of a square frame, each of the first board units (410) is perpendicularly bent from the frame board (415), and each of the first board units (410) is electrically connected via the frame board (415).

Referring to FIG. 1 again, the first board unit (410) is electrically connected to the second driving unit (220) fixed to the housing (230) of the handshake correction module (200) to apply a driving signal to the second driving unit (220).

The second board unit (420) is extended from any one of four (4) first board units (410). The second board unit (420) takes a shape of a square frame centrally formed with a square opening. The second board unit (420) is arranged opposite to the connection member (200) of the second board unit (420).

The second board unit (420) is respectively formed with a through hole (425) penetrated by the boss (530) of the fixation member (500) passing the through hole (525) passing the coupling unit (527) of the inner connection unit (320) of the connection member (200), and a through hole (428) coupled to the coupling boss (358) formed at the cover (350). Thus, the second board unit (420) is fixed to an upper surface of the auto focus module (100) along with the connection member (200), and the auto focus module (100) is tilted by the second board unit (420) and the connection member (200) for handshake correction.

The third board unit (430) passes through the auto focus module (100) and the fixation member (500) to be electrically connected to the terminal (412) exposed from the base (130) of the auto focus module (100) and applies a driving signal to the terminal (412). The third board unit (430) is bent from the second board unit (420) in parallel with the first board unit (410) and takes a shape of 'T', for example. The third board unit (430) is accommodated into an accommodation groove (512) formed at the fixation member (500).

The connection board (440) is extended from the second board unit (420) and is connected to an outside circuit board to transmit a driving signal from the outside circuit board to the first board unit (410), the second board unit (420) and the third board unit (430). Furthermore, any one of the first board units (410) may be electrically connected to the additional connection board (450). In a case the additional connection board (450) is connected to the first board unit (410), the additional connection board (450) and the connection board (440) may face each other as shown in FIG. 6.

In an exemplary embodiment of the present disclosure, an image signal outputted from the image sensor of the auto focus module (100) is transmitted to the outside circuit board through the flexible circuit board (400) via the third board unit (430). Half the number of image signals among the image signals outputted from the image sensor is inputted to the connection board (440), and the remaining half number of image signals are provided to the connection board (440) via the additional connection board (450) via the first board unit (410), and the remaining half number of image signals are provided to the outside circuit board from the connection board (440).

Referring to FIG. 1 again, the auto focus module (100), the handshake correction module (200), the connection member (300), the flexible circuit board (400) and the fixation member (500) are all encased inside a case (700).

The case (700) includes a bottom case (710) and an upper case (720). A floor plate of the bottom case (710) includes an opening, and the floor plate of the bottom case (710) is accommodated with the frame board (415) of the first board unit (410) of the flexible circuit board (400). An inner surface of the lateral plate of the bottom case (710) is arranged with the first board unit (410).

The upper case (720) is coupled to the bottom case (710) and is formed with an opening exposing the lens.

As apparent from the foregoing, the voice coil motor according to the present disclosure has an industrial adaptability in that a digital image quality is further improved by freely adjusting a gap between a lens and an image sensor using an auto focus module, and handshake correction is also performed by tilting the auto focus module while an upper end of the auto focus module is elastically fixed.

The above-mentioned VCM according to the present disclosure may, however, be embodied in many different forms and should not be construed as limited to the embodiment set forth herein. Thus, it is intended that embodiment of the present disclosure may cover the modifications and variations of this disclosure provided they come within the scope of the appended claims and their equivalents. While particular features or aspects may have been disclosed with respect to several embodiments, such features or aspects may be selectively combined with one or more other features and/or aspects of other embodiments as may be desired.

What is claimed is:

1. A VCM (Voice Coil Motor), the VCM comprising:
an auto focus module including a first driving member moving a lens;
a fixation member coupled to an outer surface of the auto focus module;
a second driving member moving the auto focus module;
a housing disposed at an outer side of the auto focus module;
a connection member coupled to the housing and at least a portion of an upper surface of the fixation member; and
a flexible circuit board electronically connected to at least one of the first driving member and the second driving member,
wherein the at least a portion of the upper surface of the fixation member is coupled to the flexible circuit board.

2. The VCM of claim 1, wherein the auto focus module further includes a bobbin coupled to the lens, and a yoke disposed at an outer side of the bobbin.

3. The VCM of claim 2, wherein the first driving member includes a first auto focus driving unit coupled to the bobbin, and a second auto focus driving unit coupled to the yoke and facing the first auto focus driving unit.

4. The VCM of claim 3, wherein the first auto focus driving unit comprises a coil, and the second auto focus driving unit includes a magnet.

5. The VCM of claim 2, wherein the auto focus module further includes an elastic member coupled to the bobbin and the yoke;
wherein the elastic member includes an upper elastic member coupled to an upper surface of the bobbin, and a bottom elastic member coupled to a bottom surface of the bobbin and a bottom surface of the yoke;
wherein the bottom elastic member includes a first bottom elastic member and a second bottom elastic member spaced apart from the first bottom elastic member; and wherein the first and second bottom elastic members each includes a terminal electrically connected to the flexible circuit board.

6. The VCM of claim 5, wherein the auto focus module further includes a base supporting the yoke; and wherein the bottom elastic member is brought into contact with an upper surface of the base, when no driving signal is applied to the first driving member.

7. The VCM of claim 5, wherein the auto focus module further comprises a base supporting the yoke; and wherein the bottom elastic member is distanced from an upper surface of the base, when no driving signal is applied to the first driving member.

8. The VCM of claim 5, wherein the second driving member includes a first driving unit coupled to the fixation member, and a second driving unit coupled to the housing and facing the first driving unit; and wherein the first driving unit includes a coil and the second driving unit includes a magnet.

9. The VCM of claim 8, wherein the flexible circuit board includes a first board unit mounted with the second driving unit, a second board unit extended from the first board unit and coupled to the fixation member, and a third board unit extended from the second board unit and connected to the terminal.

10. The VCM of claim 9, wherein the second board unit is formed with a connection board connected to an outside circuit board.

11. The VCM of claim 10, wherein the first board unit is formed with an additional connection board overlapping with the connection board.

12. The VCM of claim 9, wherein the third board unit takes a shape of 'T'.

13. The VCM of claim 9, wherein a portion of the third board unit is disposed between the fixation member and the auto focus module, and wherein an inner surface of the fixation member is formed with an accommodation groove accommodating the portion of the third board unit.

14. The VCM of claim 1, wherein the fixation member includes a gap reduction unit protruded from a corner unit.

15. The VCM of claim 1, further comprising a handshake correction module yoke disposed between the fixation member and a first driving unit of the second driving member, wherein a bottom surface of the handshake correction module yoke is formed with a support unit bent outwards to support a bottom end of the first driving unit.

16. The VCM of claim 5, further comprising a support member depressing and fixing a rear surface of the flexible circuit board connected to the terminal and supporting the fixation member.

17. The VCM of claim 1, wherein the connection member includes an inner connection unit, and an outer connection unit disposed on the housing and disposed outside the inner connection unit;

wherein the inner connection unit is coupled to a boss protruded from the fixation member; and wherein the boss of the fixation member is coupled with the flexible circuit board.

18. The VCM of claim 17, further comprising a cover coupled to the flexible circuit board, and fixing the outer connection unit of the connection member to the housing.

19. The VCM of claim 1, further comprising a bottom case and an upper case accommodating the auto focus module, the handshake correction module, the connection member and the flexible circuit board.

* * * * *